United States Patent [19]

Ridyard et al.

[11] Patent Number: 5,019,134
[45] Date of Patent: May 28, 1991

[54] REACTIVE DYES

[75] Inventors: Denis R. A. Ridyard, Stockport; Peter Smith, Bury, both of England

[73] Assignee: Imperial Chemical Industries PLC, London, England

[21] Appl. No.: 391,291

[22] Filed: Aug. 8, 1989

[30] Foreign Application Priority Data

Aug. 17, 1988 [GB] United Kingdom ............... 8819534
Oct. 18, 1988 [GB] United Kingdom ............... 8824344

[51] Int. Cl.$^5$ ..................... C09B 62/44; C09B 19/02; C07D 265/38
[52] U.S. Cl. ......................................... 8/549; 8/513; 544/76; 544/77
[58] Field of Search ...................... 8/543, 549; 544/76, 544/77

[56] References Cited

U.S. PATENT DOCUMENTS

| | | | |
|---|---|---|---|
| 4,435,181 | 3/1984 | Hoguet et al. | 8/549 |
| 4,588,411 | 5/1986 | Scheibli et al. | 8/543 |
| 4,631,065 | 12/1986 | Seitz et al. | 8/549 |
| 4,705,524 | 11/1987 | Hähnke | 8/549 |
| 4,711,642 | 12/1987 | Wolff et al. | 8/549 |
| 4,713,082 | 12/1987 | Scheibli et al. | 8/543 |
| 4,780,107 | 10/1988 | Sawamoto et al. | 8/543 |
| 4,808,706 | 2/1989 | Seiler | 8/543 |

FOREIGN PATENT DOCUMENTS

| | | |
|---|---|---|
| 0134033 | 3/1985 | European Pat. Off. |
| 0158857 | 12/1985 | European Pat. Off. |
| 0170838 | 2/1986 | European Pat. Off. |
| 0212635 | 3/1987 | European Pat. Off. |
| 0260227 | 3/1988 | European Pat. Off. |
| 0299328 | 3/1989 | European Pat. Off. |
| 2297232 | 8/1976 | France. |
| 2059985 | 4/1981 | United Kingdom. |

OTHER PUBLICATIONS

Annex to European Search Report, Application No. EP 89 70 7590.

*Primary Examiner*—Paul Lieberman
*Assistant Examiner*—J Darland
*Attorney, Agent, or Firm*—Cushman, Darby & Cushman

[57] ABSTRACT

Triphenodioxazine reactive dyes containing at least one fiber-reactive group, the dye, in the free acid form, having the formula:

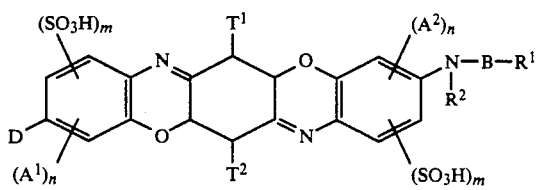

wherein
each of $T^1$ and $T^2$, independently, represents H, Cl, Br, F, $SO_3H$ or an optionally substituted alkyl or aryl radical;
each of $A^1$ and $A^2$ represents alkyl, alkoxy, Cl, Br, COOH, $SO_3H$ or optionally substituted sulphamoyl;
n has a value of 0, 1 or 2;
m has a value of 1 or 2;
$R^1$ represents H or a group of the formula:

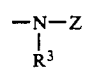

wherein
Z represents a fiber-reactive group;
each of $R^2$ and $R^3$, independently, represents H or an optionally substituted hydrocarbon radical;
B represents an optionally substituted divalent hydrocarbon radical; and
D represents a group of the formula

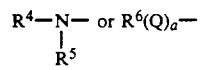

wherein
$R^4$ represents H, an optionally substituted hydrocarbon radical free from fiber-reactive residues or an acyl radical;
$R^5$ represents H or an optionally substituted hydrocarbon radical;
$R^6$ represents H or an optionally substituted hydrocarbon radical free from fiber-reactive residues;
Q represents O or S; and
a has a value of 0 or 1,
with the proviso that when D is $NH_2$, B is an arylene radical.

10 Claims, No Drawings

REACTIVE DYES

This invention relates to reactive dyes and more particularly to reactive dyes of the triphenodioxazine series and their application to textile materials.

Reactive dyes of the triphenodioxazine series are known and have been described in, for example, United Kingdom Patent Specifications 1349513, 1368158, 1450746, 1477071, 1559752 and 2059985 and in European Patent Specifications 212635, 260227 and 299328.

The present invention provides triphenodioxazine reactive dyes containing at least one fiber-reactive group which, in the free acid form, have the formula:

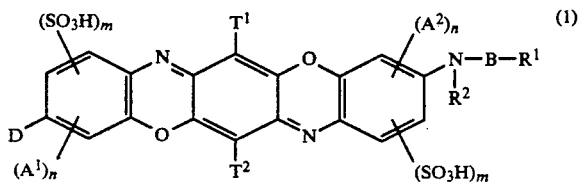

wherein
each of $T^1$ and $T^2$, independently, represents H, Cl, Br, F, $SO_3H$ or an optionally substituted alkyl or aryl radical;
each of $A^1$ and $A^2$ represents alkyl, alkoxy, Cl, Br, COOH, $SO_3H$ or optionally substituted sulphamoyl;
n has a value of 0, 1 or 2;
m has a value of 1 or 2;
$R^1$ represents H or a group of the formula:

wherein
Z represents a fiber-reactive group;
each of $R^2$ and $R^3$, independently, represents H or an optionally substituted hydrocarbon radical;
B represents an optionally substituted divalent hydrocarbon radical; and
D represents

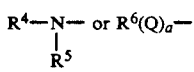

wherein
$R^4$ represents H, an optionally substituted hydrocarbon radical free from fiber-reactive residues or an acyl radical;
$R^5$ represents H or an optionally substituted hydrocarbon radical;
$R^6$ represents H or an optionally substituted hydrocarbon radical free from fiber-reactive residues;
Q represents O or S; and
a has a value of 0 or 1,
with the proviso that when D is $NH_2$, B is an arylene radical.

Examples of optionally substituted alkyl radicals which may be represented by $T^1$ and $T^2$ particularly include $C_{1-4}$-alkyl radicals. Examples of optionally substituted aryl radicals which may be represented by $T^1$ and $T^2$ include optionally substituted phenyl radicals, for example phenyl, sulphophenyl, methylphenyl, disulphophenyl, dimethylphenyl, methoxyphenyl, dimethoxyphenyl, chlorophenyl, dichlorophenyl, methylchlorophenyl, methoxymethylphenyl, methoxychlorophenyl, aminophenyl and acetylaminophenyl.

It is preferred that each of $T^1$ and $T^2$ is Cl or Br.

Examples of alkyl and alkoxy radicals which may be represented by $A^1$ and $A^2$ particularly include $C_{1-4}$-alkyl and alkoxy radicals. In most cases, $A^1$ and $A^2$ will be identical.

It is preferred that n is 0 and that m is 1.

Fiber-reactive groups have been fully described in the prior art, for example in our GB-A-2063284. Such groups are capable, under suitable conditions, of reacting with the hydroxyl groups present in cellulosic fibers or with the amino groups present in natural and synthetic polyamide fibers to form a covalent linkage between the dye and the fiber.

As examples of fiber-reactive groups which may be represented by Z when $R^1$ is a group of the formula:

there may be mentioned aliphatic sulphonyl groups which contain a sulphate ester group in beta-position to the sulphur atom, e.g. beta-sulphato-ethylsulphonyl groups, alpha,beta- unsaturated acyl radicals of aliphatic carboxylic acids, for example acrylic acid, alpha-chloro-acrylic acid, alpha-bromoacrylic acid, propiolic acid, maleic acid and mono- and dichloro maleic acids; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha,beta-dichloro- and dibromopropionic acids or radicals of vinylsulphonyl- or beta-chloroethylsulphonyl- or beta-sulphatoethyl-sulphonyl-endo- methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals such as 2,4-dicyano-3,5-difluoro-6-chlorophenyl, 2,4-dicyano-3,5-difluoro-6-nitrophenyl, 2,4-dicyano-3,5,6-trifluorophenyl, 2,4-dicyano-3,5,6-trichlorophenyl, 2,4,6-tricyano-3,5-difluorophenyl, 2,4,6-tricyano-3,5-dichlorophenyl and heterocyclic radicals which contain 1, 2 or 3 nitrogen atoms in the heterocyclic ring and at least one cellulose reactive substituent on a carbon atom of the ring.

It may be noted that many reactive groups may be defined as both heterocyclic or acyl groups since they consist of an acyl group carrying a heterocyclic substituent. For convenience in such cases where the heterocyclic ring carries the cellulose reactive substituent these are usually referred to as heterocyclic reactive groups in this specification.

As example of such heterocyclic radicals there may be mentioned for example:
2:3-dichloroquinoxaline-5- or -6-sulphonyl,
2:3-dichloroquinoxaline-5- or -6-carbonyl,
2:4-dichloroquinazolin-6- or -7-sulphonyl,
2:4:6-trichloroquinazolin-7- or -8-sulphonyl,
2:4:7- or 2:4:8-trichloroquinazolin-6-sulphonyl,
2:4-dichloroquinazolin-6-carbonyl,
1:4-dichlorophthalazine-6-carbonyl,
4:5-dichloropyridazon-1-yl-ethylcarbonyl,
2:4-dichloropyrimidine-5-carbonyl, 4-(4':5'-dichloropyridaz-6'-on-1'-yl)benzoyl,
2-chlorobenzthiazole-6-carbonyl,
3,6-dichloropyrazin-4-carbonyl,
4-(4':5 '-dichloropyridaz-6'-on-1'-yl)phenylsulphonyl;
activated 4,6-dihalopyridin-2-yl and 2,6-dihalopyridin-4-yl groups such as:
3,4,5,6-tetrafluoropyridin-2-yl,
2,3,5,6-tetrafluoropyridin-4-yl,
2,4,6-trifluoro-3-cyanopyridin-4-yl,
2,5,6-trichloro-3-cyanopyridin-4-yl,
2,6-difluoro-3-cyano-5-chloropyridin-4-yl,
2,6-difluoro-3,5-dichloropyridin-4-yl and more particularly triazinyl or pyrimidinyl groups.

Examples of particular pyrimidinYl groups are pyrimidin-2-yl or -4-yl groups having a cellulose reactive atom or group especially Cl, Br or F in at least one of the remaining 2-, 4- and 6-positions. The 5-position may carry various substituents such as Cl or CN which are not normally cellulose reactive in themselves but may enhance the reactivity of substituents in other positions of the pyrimidine ring. As specific examples of such pyrimidinyl groups there may be mentioned:
2,6-dichloropyrimidin-4-yl,
4,6-dichloropyrimidin-2-yl,
2,5,6-trichloropyrimidin-4-yl,
4,5,6-trichloropyrimidin-2-yl,
5-chloro-2-methylsulphonyl-6-methylpyrimidin-4-yl,
2,6-dichloro-5-cyanopyrimidin-4-yl,
4,6-dichloro-5-cyanopyrimidin-2-yl,
2,6-difluoro-5-chloropyrimidin-4-yl,
4,6-difluoro-5-chloropyrimidin-2-yl,
2,6-difluoro-5-cyanopyrimidin-4-yl,
4,6-difluoro-5-cyanopyrimidin-2-yl.

Examples of particular triazinyl groups are triazin-2-yl groups having cellulose reactive atoms or groups on one or both of the 4- and 6-positions. In this instance a wide range of cellulose reactive atoms or groups are available such as activated aryloxy or various groups linked through a sulphur atom, e.g. SO₃H but the preferred reactive atoms or groups are F, Br or especially Cl; quaternary ammonium groups such as tri-lower alkyl ammonium, e.g. $(CH_3)_3N^{3\oplus}$ - and pyridinium groups especially those derived from pyridine carboxylic acids in particular from nicotinic acid.

The triazinyl groups having only one reactive atom or group on the nucleus in the 4- or 6-position may have a substituent not reactive to cellulose in the remaining 4- or 6-position.

As examples of such non-reactive substituents there may be mentioned alkyl or aryl thio groups, alkoxy or aryloxy groups and optionally substituted amino groups.

Preferred forms of these groups include lower, i.e. $C_{1-4}$-alkoxy, e.g. methoxy, ethoxy, n-propoxy and isopropoxy, butoxy and lower alkoxy lower alkoxy, e.g. beta-methoxy-ethoxy, beta-ethoxyethoxy, phenoxy and sulphophenoxy; amino; lower alkylamino, e.g. methylamino, ethylamino, butylamino, di(lower alkyl)amino, e.g. dimethylamino, diethylamino, methylethylamino, dibutylamino and groups of the latter two types in which the alkyl groups are substituted, in particular by OH, CN or SO₃H, e.g. beta-hydroxyethylamino, di(beta-hydroxyethyl)amino, beta-cyanoethylamino, di(beta-cyanoethyl)amino, beta-sulphoethylamino, beta-hydroxypropylamino, (beta-hydroxybutyl)ethylamino and (beta-hydroxyethyl)methylamino; cycloalkylamino, e.g. cyclohexylamino; cyclic amino, e.g. morpholino or piperazino; naphthylamino substituted by 1,2 or 3 SO₃H groups and optionally substituted phenyl amino groups.

As a particularly preferred form of the optionally substituted phenylamino groups there may be mentioned groups of the formula:

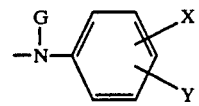

where G=H, methyl, ethyl, -sulphomethyl, beta-carboxy-, beta-hydroxy- or beta-cyanoethyl and Y and X are each independently selected from H, COOH, SO₃H, CH₃, C₂H₅, OCH₃, OC₂H₅, Cl, Br, CN, NO₂, NHCOCH₃ and beta-sulphatoethylsulphonyl.

Optionally substituted hydrocarbon radicals which may be represented by $R^2$, $R^3$ and $R^5$ include optionally substituted alkyl (especially $C_{1-4}$-alkyl), and optionally substituted aryl (especially phenyl) radicals.

Optionally substituted divalent hydrocarbon radicals which may be represented by B include optionally substituted alkylene, aralkylene and arylene radicals with the above-mentioned proviso that B must be arylene when D is NH₂.

As examples of alkylene and aralkylene radicals which may be represented by $R^2$, there may be mentioned:
ethylene
1,2- and 1,3-propylene
2-hydroxy-1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2.2-dimethyl-1,3-propylene
1-phenylethylene
1-chloro-2,3-propylene
1,6-and2,5-hexylene
2,3-diphenyl-1,4-butylene
1-(methoxycarbonyl)-1,5-pentylene
1-carboxy-1,5-pentylene
2,7-heptylene
3-methyl-1,6-hexylene
—CH₂CH₂OCH₂CH₂-
—CH₂CH₂SCH₂CH₂-
—CH₂CH₂SSCH₂CH₂-

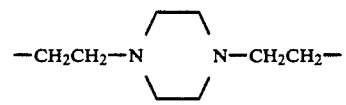

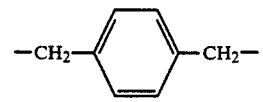

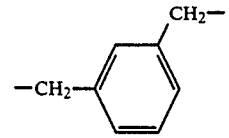

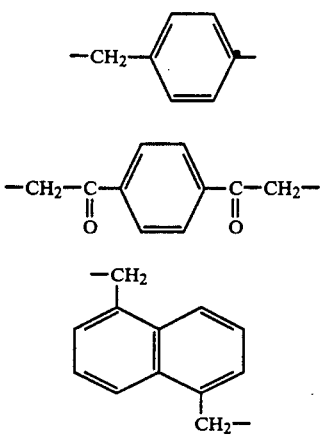

As examples of arylene radicals which may be represented by B, there may be mentioned 1,3- and 1,4-phenylene, 1,4-naphthylene and other divalent radicals containing one or more benzene and/or naphthalene nuclei which may optionallY be sulphonated.

Optionally substituted hydrocarbon radicals free from fiber-reactive residues which may be represented by $R^4$ and $R^6$ include aryl (especially phenyl), aralkyl, cycloalkyl and alkyl radicals, for example $C_{1-4}$-alkyl radicals. Thus, groups whch may be represented by $R^6(Q)_6$- particularly include aryl, aryloxy, arylthio, benzyl, benzyloxy, benzylthio, alkyl, alkoxy and alkylthio.

Acyl radicals which may be represented by $R^4$ include alkyl carbonyl radicals such as acetyl, arylcarbonyl radicals such as benzoyl and acyl radicals capable of conferring fiber-reactivity on the dyes of Formula 1.

As examples of fiber-reactive acyl radicals which may be represented by $R^4$, there may be mentioned the fiber-reactive acyl radicals described above with reference to Z.

It is preferred that any fiber-reactive groups represented by $R^4$ and/or Z are vinylsulphonyl groups or precursor groups thereof or, especially, halogenotriazinyl groups, for example monochlorotriazinyl, monofluorotriazinyl or dichlorotriazinyl groups. It is also within the scope of the invention for reactive groups to be present in the form of vinylsulphonyl groups or precursors thereof, for example hydroxyethylsulphonyl, sulphatoethylsulphonyl or chloroethylsulphonyl, attached directly to B, for example when B is arylene and $R^1$ is H.

One valuable class of dyes within the scope of Formula 1 comprises the dyes which, in the free acid form, have the formula:

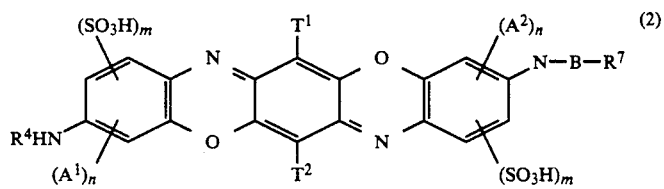

wherein

A represents alkyl, alkoxy, Cl, COOH, $SO_3H$ or optionally substituted sulphamoyl;

$R^7$ represents H or a group of the formula -NHZ;

and Z, $T^1$, $T^2$, n, m, B and $R^4$ have the meanings given above with the provisos that when $R^7$ is H, $R^4$ is an acyl group having fiber-reactive properties and when $R^4$ is H, B is an arylene radical.

As examples of useful structures within the scope of Formula 2, there may be mentioned the following:

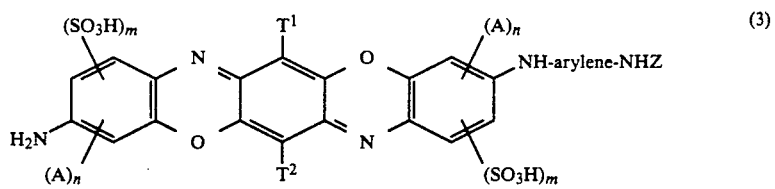

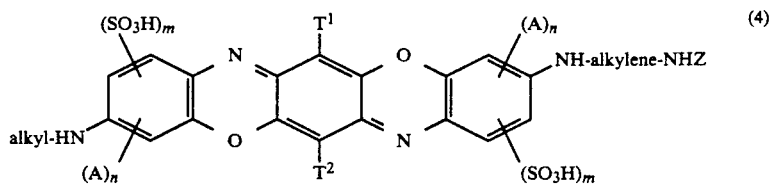

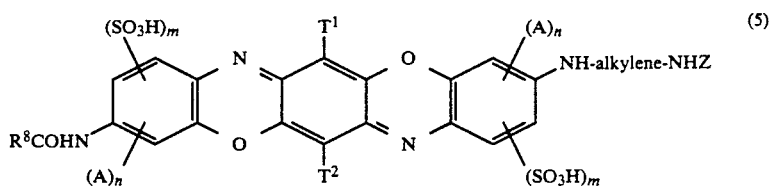

wherein $R^8$ is alkyl or aryl,

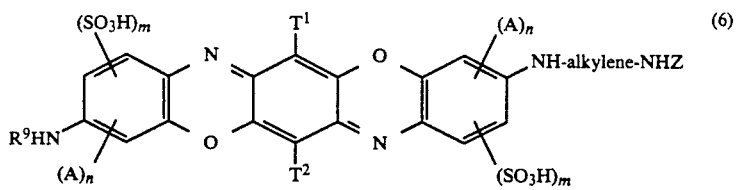

(6)

wherein $R^9$ is a fiber-reactive acyl radical,

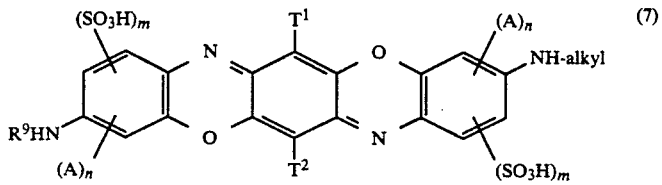

(7)

wherein $R^9$ is as above.

In the compounds of formulae (3)-(7), $T^1$, $T^2$, A, Z, n and m have the meanings given above and the fiber-reactive groups Z and $R^9$ are preferably mono- or dichlorotriazinyl or vinyl sulphonyl groups.

Another valuable class of dyes within the scope of Formula 1 comprises the dyes which, in the free acid form, have the formula:

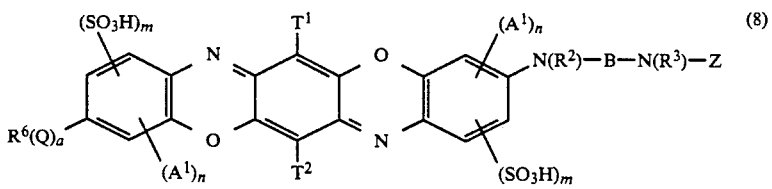

(8)

wherein $T^1$, $T^2$, $A^1$, n, m, $R^2$, $R^3$, Z, B, Q, a and $R^6$ have the meanings given above.

It is preferred that the fiber-reactive groups represented by Z in the dyes of Formula 8 are vinylsulphonyl groups or, especially, halogenotriazinyl groups, for example monochlorotriazinyl, monofluorotriazinyl or dichlorotriazinyl groups.

The dyes of the invention may be prepared by reactions conventional to triphenodioxazine chemistry. Thus, for example, dyes of the invention may be prepared by reacting an acylating agent capable of introducing a fiber-reactive group with an unsymmetrical triphenodioxazine of the formula:

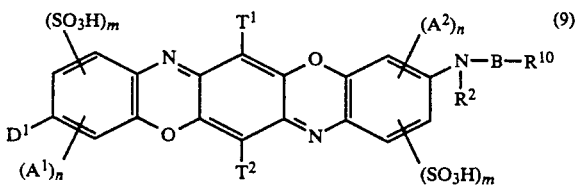

(9)

wherein $T_1$, $T^2$, $A^1$, $A^2$, n, m, $R^2$ and B have the meanings given above, $D^1$ represents a group of the formula $R^5NH-$ or $R^6(Q)_1-$ and $R^{10}$ represents H or a group of the formula $-NR^3H$ wherein $R^3$, $R^5$, $R^6$, Q and a have the meanings given above with the proviso that when $R^{10}$ is H, $D^1$ is $R^5NH-$. Suitable acylating agents particularly include cyanuric chloride and its primary condensation products with ammonia, primary or secondary amines, alcohols or mercaptans.

Unsymmetrical triphenodioxazines of Formula (9) may be obtained by methods described in the prior art, for example by ring closure of the corresponding unsymmetrical dianilides using strongly acid condensing agents, for example oleum with a persulphate. Sulphonic acid groups may be introduced into the dianilide during cyclisation, for example into any aryl groups represented by $R^6$.

The unsymmetrical dianilides may be made in a stepwise manner by known methods, for example those described in United Kingdom Patent Specifications 509891 and 509893.

The dyes prepared as described above may be isolated by any conventional means, for example by spray drying or precipitation and filtration.

The dyes contain sulphonic acid groups which confer water-solubility and they may be isolated with such groups in the free acid form. However, it is usually found more convenient to isolate the dyes in the form of salts particularly alkali metal salts, especially sodium but sometimes lithium to improve the water-solubility.

The dyes of the present invention may be used for coloring a wide range of textile materials containing hydroxyl or amino groups, for example wool, silk, synthetic polyamides and natural or regenerated cellulose, for example cotton or viscose rayon materials, by conventional dyeing, padding or printing methods used for colouring such materials with water-soluble reactive dyes. In the case of cellulose, they are preferably applied in conjunction with a treatment with an acid binding agent, for example caustic soda, sodium carbonate, phosphate, silicate or bicarbonate, which may be applied to the cellulose textile materials before, during or after the application of the dye.

The dyes of the present invention are valuable reactive dyes for cellulose. They yield bright blue colored textiles with good resistance to washing, chlorine and light. They are usually characterized by good strength and an ability to build-up to high depths of shade, the shades being somewhat redder than those of the corresponding symmetrical triphenodioxazine reactive dyes.

The invention is illustrated but not limited by the following Examples in which all parts and percentages are by weight unless otherwise indicated.

MONO-ANILIDES

Example 1

A solution of 4.6 parts of 5-amino-2-(2-aminoethylamino)benzene-sulphonic acid in 20 parts of water at pH 5 was added to a slurry of 4.8 parts of 2-methoxy-3,5,6-trichlorobenzoquinone in 100 parts of methanol at pH 5.6 and 40° C. The mixture was stirred at 40° C. for 1 hour whilst maintaininq the pH at pH 5. The mixture was cooled in ice, filtered and the solid washed with methanol and dried. 6.9 parts of compound I, 2-(4-(2-aminoethylamino-3-sulphoanilino)-3,6-dichloro-5-methoxy-1,4benzoquinone were obtained.

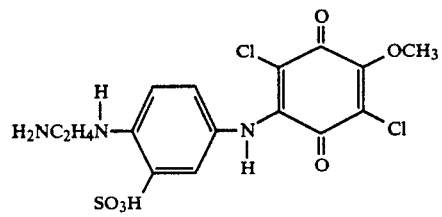

I

Example 2

15 parts of 5-amino-2-(2-aminoethylamino)-benzene-sulphonic acid was added portionwise to a slurry of 14 parts of 2-methoxy-3,5,6-trichlorobenzoquinone in 750 parts of methanol at pH 5.6 and room temperature. The mixture was stirred at room temperature for 16 hours whilst maintaining the pH at pH 5.4. The mixture was filtered and the solid washed with methanol, water and dried. 15.5 parts of compound I were obtained.

Example 3

19 parts of 4,4'-diaminodiphenylamine-2,3'-disulphonic acid was added portionwise to a slurry of 14 parts of 2-methoxy-3,5,6-trichlorobenzoquinone in 750 parts of methanol at pH 5.0 and room temperature. The mixture was stirred at room temperature for 16 hours whilst maintaining the pH at pH 5.4. The mixture was filtered and the filtrates were evaporated to dryness. 24.8 parts of compound II were obtained.

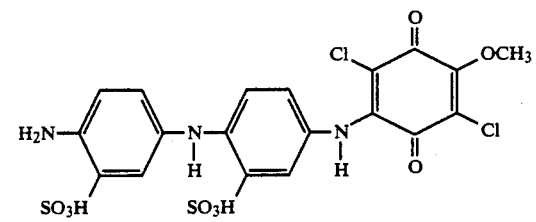

II

Example 4

A solution of 1.9 parts of aniline in 20 parts of methanol was added dropwise to a slurry of 4.8 parts of 2-methoxy-3,5,6-trichlorobenzoquinone in 100 parts of methanol at pH 5.5 and 40° C. The mixture was stirred at 40° C. for 1 hour whilst maintaining the pH at pH 5. The mixture was cooled in ice, filtered and the solid washed with methanol and dried, 4.9 parts of compound III were obtained.

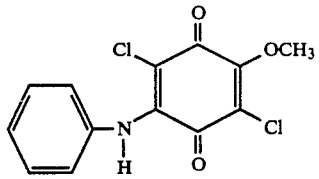

III

Examples 5–21

Further mono-anilides were prepared using the methods of Examples 2 and 4 to react 2-methyoxy-3,5,6-trichlorobenzoquinone with the aromatic amines indicated below.

| Example | Amine | Method |
|---|---|---|
| 5 | 5-amino-2-ethylaminobenzene sulphonic acid | 2 |
| 6 | 5-amino-2-(2-hydroxyethylamino)benzene sulphonic acid | 2 |
| 7 | 4-aminodiphenylamine-2-sulphonic acid | 2 |
| 8 | p-phenylenediamine sulphonic acid | 2 |
| 9 | metanilic acid | 2 |
| 10 | 5-amino-2-phenoxybenzene sulphonic acid | 2 |
| 11 | p-anisidine | 4 |
| 12 | p-toluidine | 4 |
| 13 | 3,4-dimethylaniline | 4 |
| 14 | 4-aminodiphenyl | 4 |
| 15 | 4-(ethylthio)aniline | 4 |
| 16 | 5-amino-2-phenylthiobenzene sulphonic acid | 2 |
| 17 | 4-aminodiphenylmethane | 4 |
| 18 | 5-amino-2-benzyloxybenzene sulphonic acid | 2 |
| 19 | 4-aminodiphenylamine-2,3'-disulphonic acid | 2 |
| 20 | 4-aminobenzanilide | 4 |
| 21 | 4-aminoacetanilide | 4 |

DIANILIDES

The following examples use monoanilides of Formula I, II or III as above or are from the monoanilide in Example 8 which has the Formula XXX:

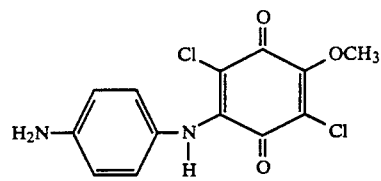

XXX and produce dianilides of Formula IV:

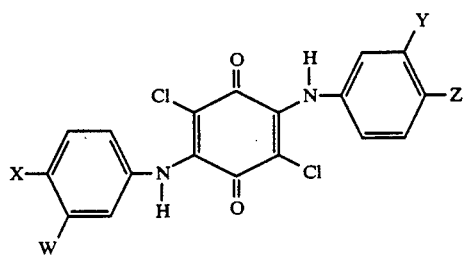

IV

Example 22

A solution of 2.1 parts of metanilic acid in 60 parts of water at pH 6 was added to a slurry of 5.1 parts of the monoanilide, I, in 175 parts of methanol at pH 6.5 and room temperature. The mixture was stirred at 50° C. for 4½ hours whilst maintaining the pH at 6.3±0.2, cooled in ice and filtered. The solid was washed with methanol and dried. 4.8 parts of the unsymmetrical dianilide of Formula IV wherein W is —$SO_3H$, X is —$NHC_2H_4NH_2$, Y is —$SO_3H$ and Z is H, were obtained.

Example 23

A solution of 2.6 parts of 3-sulpho-4-phenoxyaniline in 40 parts of water at pH 6 was added to a slurry of 5.1 parts of the monoanilide, I, in 120 parts of methanol at pH 6.5 and room temperature. The mixture was stirred at 50° C. for 3½ hours whilst maintaining the pH at 6.3±0.2, cooled in ice and filtered. The solid was washed with methanol and dried. 5.5 parts of the unsymmetrical dianilide of Formula IV wherein W is —$SO_3H$, X is —$NHC_2H_4NH_2$, Y is —$SO_3H$ and Z is phenoxy were obtained.

Example 24

A solution of 3.8 parts of p-phenylene diamine-2-sulphonic acid in 65 parts of water at pH 6.5 was added to a slurry of 6 parts of the monoanilide,III, prepared as in Example 4, in 150 parts of methanol at pH 6.5 and room temperature. The mixture was stirred at 50° C. for 3 hours whilst maintaining the pH at 6.3±0.2, cooled in ice and filtered. The solid was washed with methanol and dried. 8.3 parts of the unsymmetrical dianilide of Formula IV wherein W and X are H, Y is —$SO_3H$ and Z is —$NH_2$ were obtained.

Example 25

A solution of 4.8 parts of p-phenylene diamine-2-sulphonic acid in 125 parts of water at pH 7 was added to a slurry of 11 parts of the monoanilide,I, prepared as in Example 1 or 2, in 375 parts of methanol at pH 6.5 and room temperature. The mixture was stirred at 50° C. for 3 hours whilst maintaining the pH at 6.3±0.2, cooled in ice and filtered. The solid was washed with methanol and dried. 13.1 parts of the unsymmetrical dianilide of Formula IV wherein W is —$SO_3H$, X is —$NHC_2H_4NH_2$, Y is —$SO_3H$ and Z is —$NH_2$ were obtained.

The following unsymmetrical dianilides were prepared by these methods using the appropriate amines. In all of the following examples W in the dianilide is —$SO_3H$.

DYEBASES

The following examples produce dyebases of the Formula VIII

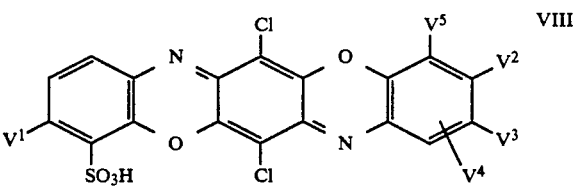

In Examples 40–68 inclusive $V^3$=H; $V^4$=H; $V^5$=$SO_3H$.

Example 40

4 parts of the unsymmetrical dianilide,IV, were added over 45 minutes to a mixture of 40 parts of conc. sulphuric acid and 32 parts of 65% oleum at room temperature. The mixture was stirred for a further 15 minutes to complete the dissolution. 2.9 parts of ammonium persulphate were added and the mixture was heated at 45–50° C. for 2 hours. The mixture was drowned out into ice/water and filtered. The solid was washed acid free with 20% brine and dried. 2.8 parts of a dyebase of Formula VIII wherein $V^1$ is N-(2-aminoethyl)amino, $V^2$ is H were obtained (the solid also contains salt). The dyebase had lambda max 600nm in aqueous medium.

Example 41

2.1 parts of the unsymmetrical dianilide prepared in Example 26 were added over 45 minutes to a mixture of 22 parts of conc. sulphuric acid and 9.5 parts of 65% oleum at room temperature. The mixture was stirred for a further 15 minutes to complete the dissolution. 2.1 parts of ammonium persulphate were added and the mixture was heated at 40° C. for 5½ hours. The mixture was drowned out into ice/water and filtered. The solid was washed acid free with 20% brine and dried. 1.6 parts of a dyebase of the Formula VIII wherein $V^1$ is N-(2-aminoethyl)amino, $V^2$ is ethylamino were obtained (the solid also contains salt). The dyebase had lambda max 616 nm in aqueous medium.

EXAMPLE 42

2 parts of the unsymmetrical dianilide,V, were added over 1 hour to 12 parts of 20% oleum keeping the temperature below 21° C. The mixture was stirred at 20–22° C. for 2½ hours. 2 parts of ammonium persulphate were added over 15 minutes and the mixture was stirred at

| Example | Formula of anilide | Dianilide of Formula IV | | |
|---|---|---|---|---|
| | | X | Y | Z |
| 26 | I | —$NHC_2H_4NH_2$ | —$SO_3H$ | —$NHC_2H_5$ |
| 27 | I | " | " | (3-$SO_3H$-4-$NH_2$—Ph)NH— |
| 28 | I | " | H | Ph |
| 29 | I | " | —$SO_3H$ | —SPh |
| 30 | I | " | H | —$NHCOC_6H_5$ |
| 31 | I | " | —$CH_3$ | —$CH_3$ |
| 32 | II | (3-$SO_3H$-4-$NH_2$—Ph)NH— | H | —$SC_2H_5$ |
| 33 | II | " | —$SO_3H$ | —NHPh |
| 34 | II | " | " | —OPh |
| 35 | II | " | " | —$NHC_3H_4OH$ |
| 36 | II | " | H | —$CH_2Ph$ |
| 37 | II | " | —$SO_3H$ | (3-$SO_3HPh$)NH— |
| 38 | XXX | $NH_2$ | —Cl | —$OCH_3$ |
| 39 | I | —$NHC_2H_4NH_2$ | H | (3-$SO_2C_2H_4OHPh$)NH— |

30° C. for 1½ hours. The mixture was drowned out into ice/water and filtered. The solid was washed acid free with 20% brine and dried. 1.4 parts of a dyebase of Formula VIII wherein $V^1$ is N-(2-aminoethyl)amino, $V^2$ is sulphophenoxy, were obtained (the solid also contains salt). The dyebase had lambda max 580nm in aqueous medium.

Example 43

5.9 parts of the unsymmetrical dianilide,VII, were added over 45 minutes to a mixture of 59 parts of conc. sulphuric acid and 47 parts of 65% oleum at room temperature. The mixture was stirred for a further 15 minutes to complete the dissolution. 4.2 parts of ammonium persulphate were added and the mixture was heated at 45-50° C. for 3½ hours. The mixture was drowned out into ice/water and filtered. The solid was washed acid free with 20% brine and dried. 7.4 parts of a dyebase of Formula VIII wherein $V^1$ is N-(2-aminoethyl)amino, $V^2$ is amino, $V^3$ is H, were obtained (the solid also contains salt). The dyebase had lambda max 605 nm in aqueous medium.

The following unsymmetrical dyebases are prepared by these methods using the appropriate dianilides:

DYESTUFFS

Example 73

(i) To 3.8 parts of aniline 2,5-disulphonic acid stirring in 35 parts water at pH7 was added 0.1 parts of mixed phosphate buffer. After cooling to 0-5° C., 2.4 parts of cyanuric chloride was added and the mixture stirred at 0-5° C. and pH 6-7 until dissolved. After screening, this solution was added to a solution of 3.8 parts of the dyebase, VIII from Example 40, dissolved in 210 parts of water at pH9-10. The reaction mixture was heated to 50-55° C. at pH 8.5-9.0 for 2 hours, salted to 35% w/v with sodium chloride/potassium chloride and filtered. The product was washed with brine and dried to give 12.6 parts of a reactive dyestuff,XII, which dyes cellulose textile materials in bright reddish blue shades.

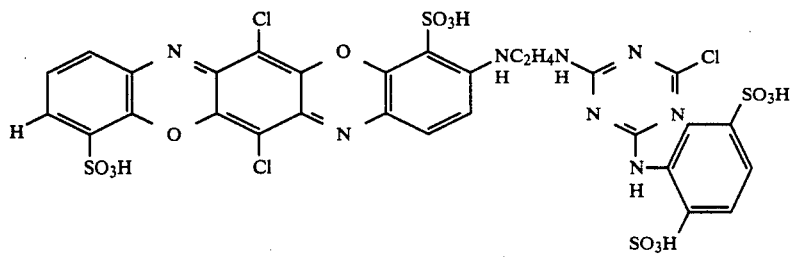

(ii) 4 parts of cyanuric chloride and a few drops of Calsolene oil were added to 7.3 parts of the dyebase, VIII,dissolved in 600 parts of water at 10°-20° C. The mixture was stirred at 10°-20°C. and pH 6-7 for 2 hours, then warmed to 40° C. for 2 hours. 20 parts of aniline-2,5-disulphonic acid dissolved in 100 parts of water were added and the pH adjusted to pH 7-8. The mixture was stirred overnight at 45° C., salted to 30% w/v with

| Example | $V^1$ | $V^2$ | $V^3$ | $V^4$ | $V^5$ | Shade |
|---|---|---|---|---|---|---|
| 44 | 2-aminoethylamino | ethoxy | | | | Reddish-blue |
| 45 | " | 3-methyl sulphoanilino | | | | " |
| 46 | " | ethylthio | | | | " |
| 47 | " | sulphophenylthio | | | | " |
| 48 | " | 2-hydroxyethylamino | | | | Blue |
| 49 | " | benzoylamino | | | | Reddish-blue |
| 50 | " | p-toluenesulphonylamino | | | | " |
| 51 | " | sulphobenzyl | | | | " |
| 52 | " | methyl | | | | " |
| 53 | 4-amino-3-sulphoanilino | sulphoanilino | | | | Blue |
| 54 | " | propoxy | | | | Reddish-blue |
| 55 | " | ethylamino | | | | Blue |
| 56 | " | 2-hydroxyethylamino | | | | " |
| 57 | " | 4-chlorosulphophenoxy | | | | Reddish-blue |
| 58 | " | ethylthio | | | | " |
| 59 | " | sulphophenylthio | | | | " |
| 60 | " | ethyl | | | | " |
| 61 | " | acetylamino | | | | Blue |
| 62 | " | benzoylamino | | | | Reddish-blue |
| 63 | " | p-toluenesulphonylamino | | | | " |
| 64 | " | 3-chloro sulphoanilino | | | | Blue |
| 65 | amino | ethylamino | | | | " |
| 66 | " | 4-amino-3-sulphoanilino | | | | " |
| 67 | " | 3-sulphoanilino | | | | " |
| 68 | " | 2-aminoethylamino | | | | " |
| 69 | NH$_2$EtNH— | Me | H | —SO$_3$H | Me | Reddish-blue |
| 70 | NH$_2$EtNH— | EtNH— | H | H | —SO$_2$NH—PhSO$_3$H | Blue |
| 71 | —NH$_2$ | —NH—Ph—NH$_2$ | H | H | —SO$_2$NHEt | Blue |
| 72 | 4-NH$_2$-3-SO$_3$HPhNH— | —OMe | Cl | H | SO$_3$H | Reddish-blue |

In the above: Me is methyl: Et is ethyl; Ph is phenyl.

sodium chloride and filtered. The product was washed with brine and dried to give 16.6 parts of the same reactive dyestuff described in (i).

Similar dyestuffs are obtained if the aniline-2,5-disulphonic acid used in Example 73 is replaced by an equivalent amount of the following amines:

| Example | Amine |
|---|---|
| 74 | 2-carboxyaniline-4,5-disulphonic acid |
| 75 | metanilic acid |
| 76 | aniline-3,5-disulphonic acid |
| 77 | N-sulphomethylaniline |
| 78 | aniline-2,4-disulphonic acid |
| 79 | 2-carboxyaniline-4-sulphonic acid |
| 80 | 3-aminoaniline-4-sulphonic acid |
| 81 | 4-aminoaniline-3-sulphonic acid |
| 82 | 3-aminoaniline-4,6-disulphonic acid |
| 83 | 4-aminoaniline-2,5-disulphonic adid |
| 84 | sulphanilic acid |
| 85 | orthanilic acid |
| 86 | 1-aminonaphthalene-6-sulphonic acid |
| 87 | 1-aminonaphthalene-7-sulphonic acid |
| 88 | 2-aminonaphthalene-5,7-disulphonic acid |
| 89 | 2-aminonaphthalene-6,8-disulphonic acid |
| 90 | 2-aminonaphthalene-8-sulphonic acid |
| 91 | 2-aminonaphthalene-7-sulphonic acid |
| 92 | 1-aminonaphthalene-3,8-disulphonic acid |
| 93 | 1-aminonaphthalene-3,6,8-trisulphonic acid |
| 94 | 2-methylaniline-5-sulphonic acid |
| 95 | 4-chloroaniline-3-sulphonic acid |

Following the procedure in Example 73 similar dyestuffs are obtained if the 2,4-dichloro-6-arylamino-s-triazines used in Examples 74–95 are replaced by equivalent amounts of the following acylating agents.

| Example | Acylating Agent |
|---|---|
| 96 | 2,4-dichloro-6-beta-hydroxyethylamino-s-triazine |
| 97 | 2,4-dichloro-6-di-beta-hydroxyethylamino-s-triazine |
| 98 | 2,4-dichloro-6-beta-hydroxypropylamino-s-triazine |
| 99 | 2,4-dichloro-6-methoxy-s-triazine |
| 100 | 2,4-dichloro-6-amino-s-triazine |
| 101 | 2,4-dichloro-6-methylamino-s-triazine |
| 102 | 2,3-dichloroquinoxaline-6-sulphonyl chloride |
| 102 | 2,4,5,6-tetrachloropyrimidine |
| 104 | 2,4,6-trichloro-s-triazine |
| 105 | 2,4-dichloro-6-n-butoxy-s-triazine |
| 106 | 2,4-dichloro-6-dimethylamino-s-triazine |
| 107 | 2,4,6-trichloropyrimidine |
| 108 | 1,4-dichlorophthalazine-6-carbonyl chloride |
| 109 | 2,4,6-trichloro-5-cyanopyrimidine |
| 110 | 2,4-dichloro-6-p-sulphophenoxy-s-triazine |
| 111 | 2,4,6-trifluoro-5-chloropyrimidine |
| 112 | 1-(4'-chlorocarbonylphenyl)-4,5-dichloro-6-pyridazone |
| 113 | 2,4,6-tribromopyrimidine |
| 114 | 2,4-dichloro-6-beta-sulphatoethylamino-s-triazine |
| 115 | 2-(2',4'-dichloro-s-triazinylamino)-5-(2'-chloro-4'-m-sulphoanilino-s-triazinylamino)benzene sulphonic acid |
| 116 | 2-(2',4'-dichloro-s-triazinylamino)-5-(2'-chloro-4'-amino-s-triazinylamino)benzene sulphonic acid |
| 117 | 2-(2',4'-dichloro-s-triazinylamino)-5-(2'-chloro-4'-(3",5"-disulphoanilino)-s-triazinylamino)benzene sulphonic acid |
| 118 | 2,4-dichloro-6-(3'-sulphatoethylsulphonylanilino)-s-triazine |
| 119 | 2,4-difluoro-6-(3'-sulphoanilino)-s-triazine |
| 120 | 2-(2',4'-dichloro-s-triazinylamino)-4-(2'-chloro-4'-m-sulphoanilino-s-triazinylamino)benzene-1,5-disulphonic acid |
| 121 | 2-(2',4'-dichloro-s-triazinylamino)-4-(2'-chloro-4'-amino-s-triazinylamino)benzene-1,5-disulphonic acid |
| 122 | 2-(2',4'-dichloro-s-triazinylamino)-4-[2'-chloro-4'-(3",5"-disulphoanilino)-s-triazinylamino]benzene-1,5-disulphonic acid |
| 123 | 2-(2',4'-dichloro-s-triazinylamino)-4-[2'-chloro-4'-(2",5"-disulphoanilino)-s-triazinylamino]benzene-1,5-disulphonic acid |
| 124 | 2-(2',4'-dichloro-s-triazinylamino)-5-(2'-chloro-4'-methoxy-s-triazinylamino)benzene-1,4-disulphonic acid |
| 125 | 2-(2',4'-dichloro-s-triazinylamino)-5-(2'-chloro-4'-amino-s-triazinylamino)benzene-1,4-disulphonic acid |
| 126 | 2-(2',4'-dichloro-s-triazinylamino)-5-[2'-chloro-4'-(m-sulphoanilino)-s-triazinylamino]benzene-1,4-disulphonic acid |
| 127 | 2-(2',4'-dichloro-s-triazinylamino)-5-[2'-chloro-4'-(3",5"-disulphoanilino)-s-triazinylamino]benzene-1,4-disulphonic acid |
| 128 | 2-(2',4'-dichloro-s-triazinylamino)-5-[2'-chloro-4'-(2",5"-disulphoanilino)-s-triazinylamino]benzene-1,4-disulphonic acid |
| 129 | 2-(2',4'-dichloro-s-triazinylamino)-5-[2'-chloro-4'-(4"-sulphoanilino)-s-triazinylamino]benzene-1,4-disulphonic acid |
| 130 | 2-(2',4'-dichloro-s-triazinylamino)-5-[2'-chloro-4'-(2",4"-disulphoanilino)-s-triazinylamino]benzene-1,4-disulphonic acid |
| 131 | 2-(2',4'-dichloro-s-triazinylamino)-5-[2'-bromo-4'-(2",4"-disulphoanilino)-s-triazinylamino]benzene-1,4-disulphonic acid |
| 132 | 2-(2',4'-dichloro-s-triazinylamino)-5-[2'-chloro-4'-(2"-methyl-5"-sulphoanilino)-s-triazinylamino]benzene-1,4-disulphonic acid |
| 133 | 2-(2',4'-dichloro-s-triazinylamino)-5-[2'-chloro-4'-(o-sulphoanilino)-s-triazinylamino]benzene-1,4-disulphonic acid |
| 134 | 2-(2',4'-dichloro-s-triazinylamino)-5-[2'-chloro-4'-(N"-sulphomethylanilino)-s-triazinylamino]benzene-1,4-disulphonic acid |
| 135 | 2-(2',4'-dichloro-s-triazinylamino)-5-[2'-chloro-4'-(3",6",8"-trisulphonaphthyl-1"-amino)-s-triazinylamino]benzene-1,4-disulphonic acid |
| 136 | 2-(2',4'-dichloro-s-triazinylamino)-5-[2'-chloro-4'-(4",6",8"-trisulphonaphthyl-2"-amino)-s-triazinylamino]benzene-1,4-disulphonic acid |
| 137 | 2-(2',4'-dichloro-s-triazinylamino)-5-[2'-chloro-4'-(N"-methyl-3"-sulphoanilino)-s-triazinylamino]benzene-1,4-disulphonic acid |
| 138 | 2-(2',4'-dichloro-s-triazinylamino)-5-[2'-chloro-4'-(2"-methyl-4",5"-disulphoanilino)-s-triazinylamino]benzene-1,4-disulphonic acid |
| 139 | 2-(2',4'-dichloro-s-triazinylamino)-5-[2'-chloro-4-sulphomethylamino-s-triazinylamino]benzene-1,4-disulphonic acid |
| 140 | 2-(2',4'-dichloro-s-triazinylamino)-6-[2'-chloro-4'-(3",6",8"-trisulphonaphthyl-1"-amino)-s-triazinylamino]naphthalene-4,8-disulphonic acid |
| 141 | 2-(2',4'-dichloro-s-triazinylamino)-6-[2'-chloro-4'-(3",5"-disulphoanilino)-s-triazinylamino]naphthalene-4,8-disulphonic acid |
| 142 | 2-(2',4'-dichloro-s-triazinylamino)-6-[2'-chloro-4'-(4",6",8"-trisulphonaphthyl-2"-amino)-s-triazinylamino]naphthalene-4,8-disulphonic acid |
| 143 | 1-(2',4'-dichloro-s-triazinylamino)-5-[2'-chloro-4'-(3",6",8"-trisulphonaphthyl-1"-amino)-s-triazinylamino]naphthalene-3,7-disulphonic acid |

The following examples produce dyes of the Formula XIII

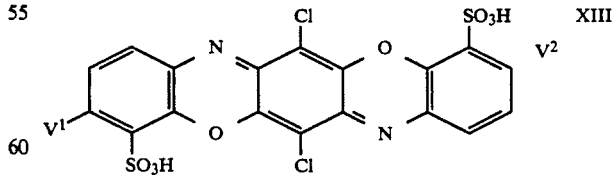

Example 144

If dyebase from Example 41 is used in place of dyebase from Example 40 in Example 73 a dyestuff is obtained which is believed to be of Formula XIII wherein $V^1$ is ethylamino and $V^2$ is a group of Formula XXV:

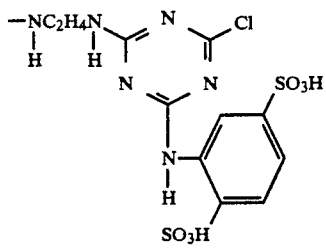

XXV and which dyes cellulose in bright greenish blue shades.

Similar dyestuffs are obtained if the aniline-2,5-disulphonic acid used in Example 144 is replaced by an equivalent amount of each of the following amines.

| Example | Amine |
|---|---|
| 145 | 2-carboxyaniline-4,5-disulphonic acid |
| 146 | metanilic acid |
| 147 | aniline-3,5-disulphonic acid |
| 148 | N-sulphomethylaniline |
| 149 | aniline-2,4-disulphonic acid |
| 150 | 2-carboxyaniline-4-sulphonic acid |
| 151 | 3-aminoaniline-4-sulphonic acid |
| 152 | 4-aminoaniline-3-sulphonic acid |
| 153 | 3-aminoaniline-4,6-disulphonic acid |
| 154 | 4-aminoaniline-2,5-disulphonic acid |

Following the procedure in Example 144, similar dyestuffs are obtained if the 2,4-dichloro-6-arylamino-s-triazines used in Examples 145–154 are replaced by equivalent amounts of the following acylating agents.

| Example | Acylating Agent |
|---|---|
| 155 | 2,4-dichloro-6-beta-hydroxyethylamino-s-triazine |
| 156 | 2,4-dichloro-6-di-beta-hydroxyethylamino-s-triazine |
| 157 | 2,4-dichloro-6-beta-hydroxypropylamino-s-triazine |
| 158 | 2,4-dichloro-6-methoxy-s-triazine |
| 159 | 2,4-dichloro-6-amino-s-triazine |
| 160 | 2,4-dichloro-6-methylamino-s-triazine |
| 161 | 2,3-dichloroquinoxaline-6-sulphonyl chloride |
| 162 | 2,4,5,6-tetrachloropyrimidine |
| 163 | 2,4,6-trichloro-s-triazine |
| 164 | 2,4-dichloro-6-n-butoxy-s-triazine |

Example 165

If dyebase in Example 42 is used in place of dyebase in Example 40 in Example 73 a dyestuff is obtained which is believed to be of Formula XIII wherein $V^1$ is sulphophenoxy and $V^2$ is a group of Formula XXV and which dyes cellulose in bright reddish blue shades.

Similar dyestuffs are obtained if the aniline-2,5-disulphonic acid used in Example 165 is replaced by an equivalent amount of each of the following amines.

| Example | Amine |
|---|---|
| 166 | sulphanilic acid |
| 167 | orthanilic acid |
| 168 | 1-aminonaphthalene-6-sulphonic acid |
| 169 | 1-aminonaphthalene-7-sulphonic acid |
| 170 | 2-aminonaphthalene-5,7-disulphonic acid |
| 171 | 2-aminonaphthalene-6,8-disulphonic acid |

Following the procedure in Example 165, similar dyestuffs are obtained if the 2,4-dichloro-6-arylamino-s-triazines used in Examples 166–171 are replaced by equivalent amounts of the following acylating agents.

| Example | Acylating Agent |
|---|---|
| 172 | 2,4-dichloro-6-dimethylamino-s-triazine |
| 173 | 2,4,6-trichloropyrimidine |
| 174 | 1,4-dichlorophthalazine-6-carbonyl chloride |
| 175 | 2,4,6-trichloro-5-cyanopyrimidine |
| 176 | 2,4-dichloro-6-p-sulphophenoxy-s-triazine |
| 177 | 2,4,6-trifluoro-5-chloropyrimidine |
| 178 | 1-(4'-chlorocarbonylphenyl)-4,5-dichloro-6-pyridazone |
| 179 | 2,4,6-tribromopyrimidine |

EXAMPLE 180

If dyebase from Example 54 is used in place of dyebase from Example 40 in Example 13 a dyestuff is obtained which is believed to be of Formula XIII wherein $V^1$ is propoxy and $V^2$ is a group of Formula XXVI:

XXVI and which dye cellulose in bright reddish blue shades.

Similar dyestuffs are obtained if the aniline-2,5-disulphonic acid used in Example 180 is replaced by an equivalent amount of each of the following amine.

| Example | Amine |
|---|---|
| 181 | 2-aminonaphthalene-8-sulphonic acid |
| 182 | 2-aminonaphthalene-7-sulphonic acid |
| 183 | 1-aminonaphthalene-3,8-disulphonic acid |
| 184 | 1-aminonaphthalene-3,6,8-trisulphonic acid |
| 185 | 2-methylaniline-5-sulphonic acid |
| 186 | 4-chloroaniline-3-sulphonic acid |

Following the procedure in Example 180, similar dyestuffs are obtained if the 2,4-dichloro-6-arylamino-s-triazines used in Examples 181–186 are replaced by equivalent amounts of the following acylating agents.

| Example | Acylating Agent |
|---|---|
| 187 | 2,4-dichloro-6-beta-sulphatoethylamino-s-triazine |
| 188 | 2-(2',4'-dichloro-s-triazinylamino-5-(2'-chloro-4'-m-sulphoanilino-s-triazinylamino)benzene sulphonic acid |
| 189 | 2-(2',4'-dichloro-s-triazinylamino)-5-(2'-chloro-4'-amino-s-triazinylamino)benzene sulphonic acid |
| 190 | 2-(2',4'-dichloro-s-triazinylamino)-5-(2'-chloro-4'-(3'',5''-disulphoanilino)-s-triazinylamino)benzene sulphonic acid |

Example 191

If dyebase from Example 59 is used in place of dyebase from Example 40 in Example 73 a dyestuff is obtained which is believed to be of Formula XIII wherein $V^1$ is sulphothiophenoxy and $V^2$ is a group of Formula XXVI and which dyes cellulose in bright reddish blue shades.

Similar dyestuffs are obtained if the aniline-2,5-disulphonic acid used in Example 191 is replaced by an equivalent amount of each of the following amines.

| Example | Amine |
|---|---|
| 192 | 2-carboxyaniline-4,5-disulphonic acid |
| 193 | metanilic acid |
| 194 | aniline-3,5-disulphonic acid |
| 195 | N-sulphomethylaniline |
| 196 | aniline-2,4-disulphonic acid |
| 197 | 2-carboxyaniline-4-sulphonic acid |
| 198 | 3-aminoaniline-4-sulphonic acid |
| 199 | 4-aminoaniline-3-sulphonic acid |

Following the procedure in Example 191, similar dyestuffs are obtained if the 2,4-dichloro-6-arylamino-s-triazines used in Examples 192-199 are replaced by equivalent amounts of the following acylating agents.

| Example | Acylating Agent |
|---|---|
| 200 | 2,4-dichloro-6-beta-hydroxyethylamino-s-triazine |
| 201 | 2,4-dichloro-6-di-beta-hydroxyethylamino-s-triazine |
| 202 | 2,4-dichloro-6-beta-hydroxypropylamino-s-triazine |
| 203 | 2,4-dichloro-6-methoxy-s-triazine |
| 204 | 2,4-dichloro-6-amino-s-triazine |
| 205 | 2,4-dichloro-6-methylamino-s-triazine |
| 206 | 2,3-dichloroquinoxaline-6-sulphonyl chloride |
| 207 | 2,4,5,6-tetrachloropyrimidine |

Example 208

If dyebase from Example 62 is used in place of dyebase from Example 40 in Example 73 a dyestuff is obtained which is believed to be of Formula XIII wherein $V^1$ is N-(benzoyl)amino) and $V^2$ is a group of Formula XXVI and which dyes cellulose in bright reddish blue shades.

Similar dyestuffs are obtained if the aniline-2,5-disulphonic acid used in Example 208 is replaced by an equivalent amount of each of the following amines.

| Example | Amine |
|---|---|
| 209 | 3-aminoaniline-4,6-disulphonic acid |
| 210 | 4-aminoaniline-2,5-disulphonic adid |
| 211 | sulphanilic acid |
| 212 | orthanilic acid |
| 213 | 1-aminonaphthalene-6-sulphonic acid |
| 214 | 1-aminonaphthalene-7-sulphonic acid |
| 215 | 2-aminonaphthalene-5,7-disulphonic acid |

Following the procedure in Example 208, similar dyestuffs are obtained if the 2,4-dichloro-6-arylamino-s-triazines used in Examples 209 to 215 are replaced by equivalent amounts of the following acylating agents.

| Example | Acylating Agent |
|---|---|
| 216 | 2,4,6-trichloro-s-triazine |
| 217 | 2,4-dichloro-6-n-butoxy-s-triazine |
| 218 | 2,4-dichloro-6-dimethylamino-s-triazine |
| 219 | 2,4,6-trichloropyrimidine |
| 220 | 1,4-dichlorophthalazine-6-carbonyl chloride |
| 221 | 2,4,6-trichloro-5-cyanopyrimidine |
| 222 | 2,4-dichloro-6-p-sulphophenoxy-s-triazine |
| 223 | 2,4,6-trifluoro-5-chloropyrimidine |

Example 224

If dyebase from Example 66 is used in place of dyebase from Example 40 in Example 73 a dyestuff is obtained which is believed to be of Formula XIII wherein $V^1$ is amino and $V^2$ is a group of Formula XXVI and which dyes cellulose in bright reddish blue shades.

Similar dyestuffs are obtained if the aniline-2,5-disulphonic acid used in Example 224 is replaced by an equivalent amount of each of the following amines.

| Example | Amine |
|---|---|
| 225 | 2-aminonaphthalene-6,8-disulphonic acid |
| 226 | 2-aminonaphthalene-8-sulphonic acid |
| 227 | 2-aminonaphthalene-7-sulphonic acid |
| 228 | 1-aminonaphthalene-3,8-disulphonic acid |
| 229 | 1-aminonaphthalene-3,6,8-trisulphonic acid |
| 230 | 2-methylaniline-5-sulphonic acid |
| 231 | 4-chloroaniline-3-sulphonic acid |

Following the procedure in Example 224, similar dyestuffs are obtained if the 2,4-dichloro-6-arylamino-s-triazines used in Examples 225 to 231 are replaced by equivalent amounts of the following acylating agents.

| Example | Acylating Agent |
|---|---|
| 232 | 1-(4'-chlorocarbonylphenyl)-4,5-dichloro-6-pyridazone |
| 233 | 2,4,6-tribromopyrimidine |
| 234 | 2,4-dichloro-6-beta-sulphatoethylamino-s-triazine |
| 235 | 2-(2',4'-dichloro-s-triazinylamino-5-(2'-chloro-4'-m-sulphoanilino-s-triazinylamino)benzene sulphonic acid |
| 236 | 2-(2',4'-dichloro-s-triazinylamino)-5-(2'-chloro-4'-amino-s-triazinylamino)benzene sulphonic acid |
| 237 | 2-(2',4'-dichloro-s-triazinylamino)-5-(2'-chloro-4'-(3",5"-disulphoanilino)-s-triazinylamino)benzene sulphonic acid |

Example 238

To 3.8 parts of aniline-2,5-disulphonic acid stirring in 35 parts water at pH7 was added 0.1 parts of mixed phosphate buffer. After cooling to 0-5° C., 2.4 parts of cyanuric chloride was added and the mixture stirred at 0°-5° C. and pH 6-7 until dissolved. After screening, this solution was added to a solution of 1.5 parts of the dyebase from Example 65, dissolved in 150 parts of water at pH 9. The reaction mixture was stirred at pH 8.5-9.0 and 35° C. overnight, salted to 15% w/v with sodium chloride and filtered. The product was washed with brine and dried to give 2.1 parts of a reactive dyestuff of Formula XIII wherein $V^1$ is N-(ethyl)amino and $V^2$ is a group of Formula XXVII:

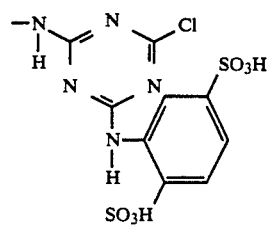

XXVII which dyes cellulose textile materials in bright mid blue shades.

Similar dyestuffs are obtained if the aniline-2,5-disulphonic acid used in Example 238 is replaced by an equivalent amount of each of the following amines.

| Example | Amine |
|---|---|
| 239 | aniline-2,4-disulphonic acid |

-continued

| Example | Amine |
|---|---|
| 240 | 2-carboxyaniline-4-sulphonic acid |
| 241 | 3-aminoaniline-4-sulphonic acid |
| 242 | 4-aminoaniline-3-sulphonic acid |
| 243 | 3-aminoaniline-4,6-disulphonic acid |
| 244 | 4-aminoaniline-2,5-disulphonic adid |
| 245 | sulphanilic acid |
| 246 | orthanilic acid |
| 247 | 1-aminonaphthalene-6-sulphonic acid |
| 248 | 1-aminonaphthalene-7-sulphonic acid |

Following the procedure in Example 238, similar dyestuffs are obtained if the 2,4-dichloro-6-arylamino-s-triazines used in Examples 239 to 248 are replaced by equivalent amounts of the following acylating agents.

| Example | Acylating Agent |
|---|---|
| 249 | 2,4-dichloro-6-methylamino-s-triazine |
| 250 | 2,3-dichloroquinoxaline-6-sulphonyl chloride |
| 251 | 2,4,5,6-tetrachloropyrimidine |
| 252 | 2,4,6-trichloro-s-triazine |
| 253 | 2,4-dichloro-6-n-butoxy-s-triazine |
| 254 | 2,4-dichloro-6-dimethylamino-s-triazine |
| 255 | 2,4,6-trichloropyrimidine |
| 256 | 1,4-dichlorophthalazine-6-carbonyl chloride |
| 257 | 2,4,6-trichloro-5-cyanopyrimidine |

Example 258

To 7.6 parts of aniline-2,5-disulphonic acid stirring in 70 at pH7 was added 0.2 parts of mixed phosphate buffer. After cooling to 0°-5° C., 4.8 parts of cyanuric chloride was added and the mixture stirred at 0°-5° C. and pH 6-7 until dissolved. After screening, this solution was added to a solution of 1.5 parts of the dyebase from Example 68, dissolved in 150 parts of water at pH 9. The reaction mixture was stirred at pH 8.5-9.0 and 35° C. overnight, salted to 15% w/v with sodium chloride and filtered. The product was washed with brine and dried to give 2.4 parts of a reactive dyestuff of Formula XIII wherein $V^1$ is a group of Formula XXVII and $V^2$ is a group of Formula XXV which dyes cellulose textile materials in bright mid blue shades.

Similar dyestuffs are obtained if the aniline-2,5-disulphonic acid used in Example 258 is replaced by an equivalent amount of each of the following amines.

| Example | Amine |
|---|---|
| 259 | 2-aminonaphthalene-5,7-disulphonic acid |
| 260 | 2-aminonaphthalene-6,8-disulphonic acid |
| 261 | 2-aminonaphthalene-8-sulphonic acid |
| 262 | 2-aminonaphthalene-7-disulphonic acid |
| 263 | 1-aminonaphthalene-3,8-disulphonic acid |
| 264 | 1-aminonaphthalene-3,6,8-trisulphonic acid |
| 265 | 2-methylaniline-5-sulphonic acid |
| 266 | 4-chloroaniline-3-sulphonic acid |

Following the procedure in Example 258, similar dyestuffs are obtained if the 2,4-dichloro-6-arylamino-s-triazines used in Examples 259 to 266 are replaced by equivalent amounts of the following acylating agents.

| Example | Acylating Agent |
|---|---|
| 267 | 2,4-dichloro-6-beta-hydroxyethylamino-s-triazine |
| 268 | 2,4-dichloro-6-di-beta-hydroxyethylamino-s-triazine |
| 269 | 2,4-dichloro-6-beta-hydroxypropylamino-s-triazine |
| 270 | 2,4-dichloro-6-methoxy-s-triazine |
| 271 | 2,4-dichloro-6-amino-s-triazine |
| 272 | 2,4-dichloro-6-p-sulphophenoxy-s-triazine |
| 273 | 2,4,6-trifluoro-5-chloropyrimidine |
| 274 | 1-(4'-chlorocarbonylphenyl)-4,5-dichloro-6-pyridazone |
| 275 | 2,4,6-tribromopyrimidine |

Example 276

To 7.6 parts of aniline-2,5-disulphonic acid stirring in 70 parts water at pH7 was added 0.2 parts of mixed phosphate buffer. After cooling to 0°-5° C., 4.8 parts of cyanuric chloride was added and the mixture stirred at 0°-5° C. and pH 6-7 until dissolved. After screening, this solution was added to a solution of 1.8 parts of the dyebase from Example 66, dissolved in 150 parts of water at pH 9. The reaction mixture was stirred at pH 8.5-9.0 and 35° C. overnight, salted to 15% w/v with sodium chloride and filtered. The product was washed with brine and dried to give 2.3 parts of a reactive dyestuff of Formula XIII wherein $V^1$ is a group of Formula XXVII and $V^2$ is a group of Formula XXVI which dyes cellulose textile materials in bright mid blue shades.

Similar dyestuffs are obtained if the aniline-2,5-disulphonic acid used in Example 276 is replaced by an equivalent amount of each of the following amines.

| Example | Amine |
|---|---|
| 277 | 2-carboxyaniline-4,5-disulphonic acid |
| 278 | metanilic acid |
| 279 | aniline-3,5-disulphonic acid |
| 280 | N-sulphomethylaniline |
| 281 | aniline-2,4-disulphonic acid |
| 282 | 2-carboxyaniline-4-sulphonic acid |
| 283 | 3-aminoaniline-4-sulphonic acid |
| 284 | 4-aminoaniline-3-sulphonic acid |
| 285 | 3-aminoaniline-4,6-disulphonic acid |
| 286 | 4-aminoaniline-2,5-disulphonic acid |

Following the procedure in Example 276, similar dyestuffs are obtained if the 2,4-dichloro-6-arylamino-s-triazines used in Examples 277 to 286 are replaced by equivalent amounts of the following acylating agents.

| Example | Acylating Agent |
|---|---|
| 287 | 2,4-dichloro-6-amino-s-triazine |
| 288 | 2,4-dichloro-6-methylamino-s-triazine |
| 289 | 2,3-dichloroquinoxaline-6-sulphonyl chloride |
| 290 | 2,4,5,6-tetrachloropyrimidine |
| 291 | 2,4-dichloro-6-beta-sulphatoethylamino-s-triazine |
| 292 | 2-(2',4'-dichloro-s-triazinylamino-5-(2'-chloro-4'-m-sulphoanilino-s-triazinylamino)benzene sulphonic acid |
| 293 | 2-(2',4'-dichloro-s-triazinylamino)-5-(2'-chloro-4'-amino-s-triazinylamino)benzene sulphonic acid |
| 294 | 2-(2',4'-dichloro-s-triazinylamino)-5-(2'-chloro-4'-(3'',5''-disulphoanilino)-s-triazinylamino)benzene sulphonic acid |

The following dyebases prepared by the methods outlined above function as reactive dyes without further modification, these are of Formula XIII:

| Example | Dyebase | Shade |
|---|---|---|
| 295 | $V^1$ is N-(2-aminoethyl)amino | Greenish-blue |

-continued

| Example | Dyebase | Shade |
|---|---|---|
| | 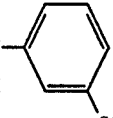  V² is —NH—C₆H₄—SO₂C₂H₄OSO₃H | |
| 296 | V¹ is ethoxy | Reddish-blue |
| | 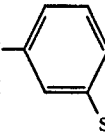  V² is —NH—C₆H₃(NHC₂H₅)—SO₂C₂H₄OSO₃H | |
| 297 | V¹ is sulphophenoxy | Reddish-blue |
| | 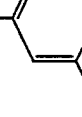  V² is —NH—C₆H₃(NH₂)—SO₂C₂H₄OSO₃H | |
| 298 | | Greenish-blue |
| |   V¹ is —NH—C₆H₃(NH₂)—SO₃H | |
| | 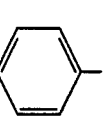  V² is —NH—C₆H₄—SO₂C₂H₄OSO₃H | |
| 299 | V¹ is amino | Reddish-blue |
| | V² is —NH—C₆H₄—SO₂C₂H₄OSO₃H | |

We claim:

1. A triphenodioxazine reactive dye containing at least one fiber-reactive group, the dye, in the free acid form, having the formula:

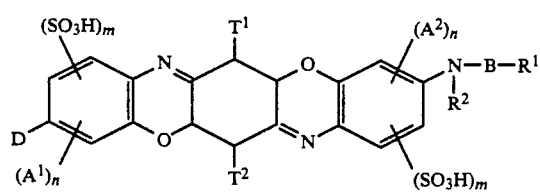

wherein each of T¹ and T², independently, represents H, Cl, Br, F, SO₃H or an optionally substituted alkyl or aryl radical;

each of A¹ and A² represents alkyl, alkoxy, Cl, Br, COOH, SO₃H or optionally substituted sulphamoyl;

n has a value of 0, 1 or 2;

m has a value of 1 or 2;

R¹ represents H or a group of the formula:

$$-\underset{R^3}{N}-Z$$

wherein

Z represents a fiber-reactive group;

each of R² and R³, independently, represents H or an optionally substituted hydrocarbon radical;

B represents an optionally substituted divalent hydrocarbon radical; and

D represents a group of the formula $$R^4-\underset{R^5}{N}-\text{ or } R^6(Q)_a-$$

wherein

R⁴ represents an optionally substituted hydrocarbon radical free from fiber-reactive residues or an acyl radical;

R⁵ represents H or an optionally substituted hydrocarbon radical;

R⁶ represents H or an optionally substituted hydrocarbon radical free from fiber-reactive residues;

Q represents O or S; and a has a value of 0 or 1.

2. A reactive dye according to claim 1 wherein each of T¹ and T² is Cl or Br.

3. A reactive dye according to claim 1 or claim 2 wherein A¹ and A² are the same.

4. A reactive dye according to any preceding claim wherein n is 0 and m is 1.

5. A reactive dye according to any preceding claim wherein the fiber-reactive groups are selected from vinylsulphonyl groups or precursors thereof and halogenotriazinyl groups.

6. A reactive dye according to claim 5 wherein the fiber-reactive groups comprise monochlorotriazinyl, monofluorotriazinyl or dichlorotriazinyl groups.

7. A reactive dye according to claim 1 having the structure:

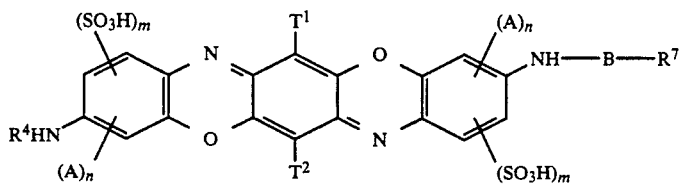

wherein

A represents alkyl, alkoxy, Cl, COOH, SO₃H or optionally substituted sulphamoyl;

R⁷ represents H or a group of the formula —NHZ;

and Z, T¹, T², n, m, B and R⁴ have the meanings given above with the provisos that when R⁷ is H, R⁴ is an acyl group having fiber-reactive properties.

8. A reactive dye according to claim 1 having the structure:

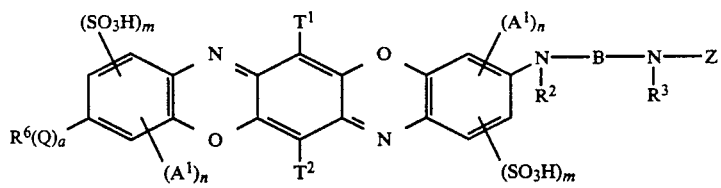

wherein $T^1$, $T^2$, $A^1$, n, m, $R^2$, $R^3$, Z, B, Q, a and $R^6$ have the meanings given in claim 1.

9. A method for the preparation of a reactive dye as defined in claim 1 which comprises reacting an acylating agent capable of introducing a fiber-reactive group with an unsymmetrical triphenodioxazine of the formula:

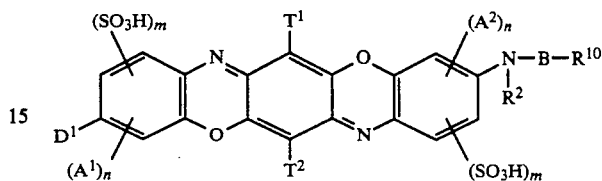

wherein $D^1$ represents a group of the formula $R^5NH$— or $R^6(Q)_a$— and $R^{10}$ represents H or a group of the formula —$NR^3H$ with the proviso that when $R^{10}$ is H, $D^1$ is $R^5NH$—, the symbols $T^1$, $T^2$, $A^1$, $A^2$, n, m, $R^2$, $R^3$, $R^5$, $R^6$, Q, a and B having the meanings given in claim 1.

10. A process for colouring textile materials which comprises applying thereto a reactive dye as defined in claim 1.

* * * * *